(12) United States Patent
Takikawa et al.

(10) Patent No.: US 9,989,136 B2
(45) Date of Patent: Jun. 5, 2018

(54) STARTING DEVICE

(71) Applicant: AISIN AW CO., LTD., Anjo-shi, Aichi-ken (JP)

(72) Inventors: Yoshihiro Takikawa, Tsushima (JP); Akihiro Nagae, Anjo (JP); Masanori Onoda, Hekinan (JP); Kazuto Maruyama, Anjo (JP); Tatsuro Honda, Nukata (JP)

(73) Assignee: AISIN AW CO., LTD., Anjo (JP)

( * ) Notice: Subject to any disclaimer, the term of this patent is extended or adjusted under 35 U.S.C. 154(b) by 99 days.

(21) Appl. No.: 15/108,683

(22) PCT Filed: Dec. 17, 2014

(86) PCT No.: PCT/JP2014/083398
§ 371 (c)(1),
(2) Date: Jun. 28, 2016

(87) PCT Pub. No.: WO2015/114978
PCT Pub. Date: Aug. 6, 2015

(65) Prior Publication Data
US 2016/0327142 A1 Nov. 10, 2016

(30) Foreign Application Priority Data
Jan. 31, 2014 (JP) .................. 2014-017530

(51) Int. Cl.
| | |
|---|---|
| *F16H 45/02* | (2006.01) |
| *F16F 15/14* | (2006.01) |
| *F16F 15/134* | (2006.01) |
| *F16F 15/123* | (2006.01) |

(52) U.S. Cl.
CPC ............ *F16H 45/02* (2013.01); *F16F 15/134* (2013.01); *F16F 15/14* (2013.01); *F16F 15/123* (2013.01); *F16F 15/145* (2013.01); *F16H 2045/0205* (2013.01); *F16H 2045/0226* (2013.01); *F16H 2045/0263* (2013.01); *F16H 2045/0294* (2013.01)

(58) Field of Classification Search
None
See application file for complete search history.

(56) References Cited

U.S. PATENT DOCUMENTS

| | | | |
|---|---|---|---|
| 4,266,641 | A | 5/1981 | Sunohara |
| 6,026,940 | A | 2/2000 | Sudau |
| 8,573,374 | B2 | 11/2013 | Magerkurth et al. |
| 2011/0031083 | A1 | 2/2011 | Matsuoka et al. |

(Continued)

FOREIGN PATENT DOCUMENTS

| | | |
|---|---|---|
| JP | S54-132061 A | 10/1979 |
| JP | 2009-293671 A | 12/2009 |

(Continued)

OTHER PUBLICATIONS

Mar. 31, 2015 Search Report issued in International Patent Application No. PCT/JP2014/083398.

*Primary Examiner* — Jacob S. Scott
(74) *Attorney, Agent, or Firm* — Oliff PLC

(57) ABSTRACT

A starting device where the lock-up clutch is a single-plate clutch including a piston having a friction material that is in frictional engagement with the input member; and the piston and the input element of the damper mechanism are coupled to each other on a radially inner side of the plurality of pendulum mass bodies so as to rotate together.

19 Claims, 5 Drawing Sheets

(56) References Cited

U.S. PATENT DOCUMENTS

2011/0099992 A1 5/2011 Magerkurth et al.
2011/0192692 A1 8/2011 Werner et al.

FOREIGN PATENT DOCUMENTS

| | | |
|---|---|---|
| JP | 2011-526344 A | 10/2011 |
| JP | 2012-506004 A | 3/2012 |
| JP | 2013-044370 A | 3/2013 |
| JP | 2013-122259 A | 6/2013 |
| WO | 2010/037661 A1 | 4/2010 |
| WO | 2014/009125 A1 | 1/2014 |

STARTING DEVICE

BACKGROUND

The present disclosure relates to a starting device including a damper mechanism, a lock-up clutch, and a centrifugal pendulum vibration absorber.

Conventionally, there is known, as a starting device of this type, a starting device that includes: a multi-plate lock-up clutch including a friction plate with friction materials attached to front and back surfaces thereof; and a centrifugal pendulum vibration absorber including an output element of a damper mechanism serving as a support member and a pendulum mass body swingably supported by the output element (see, for example, WO2010/037661). In this starting device, a peripheral portion of the friction plate of the lock-up clutch and a peripheral portion of an annular coupling member (reference numeral 36) fixed to an input element of the damper mechanism via rivets are fitted and coupled to each other. Thus, power is transmitted from the friction plate that is in frictional engagement with a housing (input member) to the input element of the damper mechanism.

SUMMARY

However, in the conventional starting device described above, the coupling member is located between a piston of the lock-up clutch and the pendulum mass body of the centrifugal pendulum vibration absorber. Therefore, the axial length of the starting device is increased, and the installation space for the pendulum mass body is limited. Thus, sufficient vibration damping effect might not be obtained.

Accordingly, an exemplary aspect of the present disclosure reduces the size of a starting device including a damper mechanism, a lock-up clutch, and a centrifugal pendulum vibration absorber, and improves the vibration damping performance of the centrifugal pendulum vibration absorber.

A starting device according to the present disclosure includes: a damper mechanism including an input element to which power is transmitted from an input member, an output element that is coupled to an input shaft of a transmission, and elastic bodies that transmit torque between the input element and the output element; a lock-up clutch capable of performing lock-up to couple the input member to the input shaft of the transmission via the damper mechanism and capable of releasing the lock-up; and a centrifugal pendulum vibration absorber including a support member that rotates together with a rotary element of the damper mechanism, and a plurality of pendulum mass bodies that are swingably supported by the support member; wherein: the lock-up clutch is a single-plate clutch including a piston having a friction material that is in frictional engagement with the input member; and the piston and the input element of the damper mechanism are coupled to each other on a radially inner side of the plurality of pendulum mass bodies so as to rotate together.

This starting device includes: a damper mechanism; a single-plate lock-up clutch including a piston having a friction material that is in frictional engagement with an input member; and a centrifugal pendulum vibration absorber including a support member that rotates together with a rotary element of the damper mechanism, and a plurality of pendulum mass bodies that are swingably supported by the support member. Further, the piston of the lock-up clutch and the input element of the damper mechanism are coupled to each other on a radially inner side of the plurality of pendulum mass bodies of the centrifugal pendulum vibration absorber so as to rotate together. Thus, since the piston and the input element are coupled to each other on the radially inner side of the plurality of pendulum mass bodies, a member that couples the piston and the input element to each other does not need to be disposed between the piston of the lock-up clutch and the plurality of pendulum mass bodies or on the radially outer side of the plurality of pendulum mass bodies. Therefore, it is possible to suppress an increase in particular in the axial length of the starting device, and to ensure sufficient installation space for the plurality of pendulum mass bodies in both the axial direction and the radial direction of the starting device. Thus, according to this starting device, it is possible to reduce the overall device size, and to further improve the vibration damping performance of the centrifugal pendulum vibration absorber by increasing the size, that is, the weight of the pendulum mass bodies.

DETAILED DESCRIPTION OF EMBODIMENTS

Hereinafter, embodiments of the present disclosure will be described with reference to the drawings.

Figure 1:
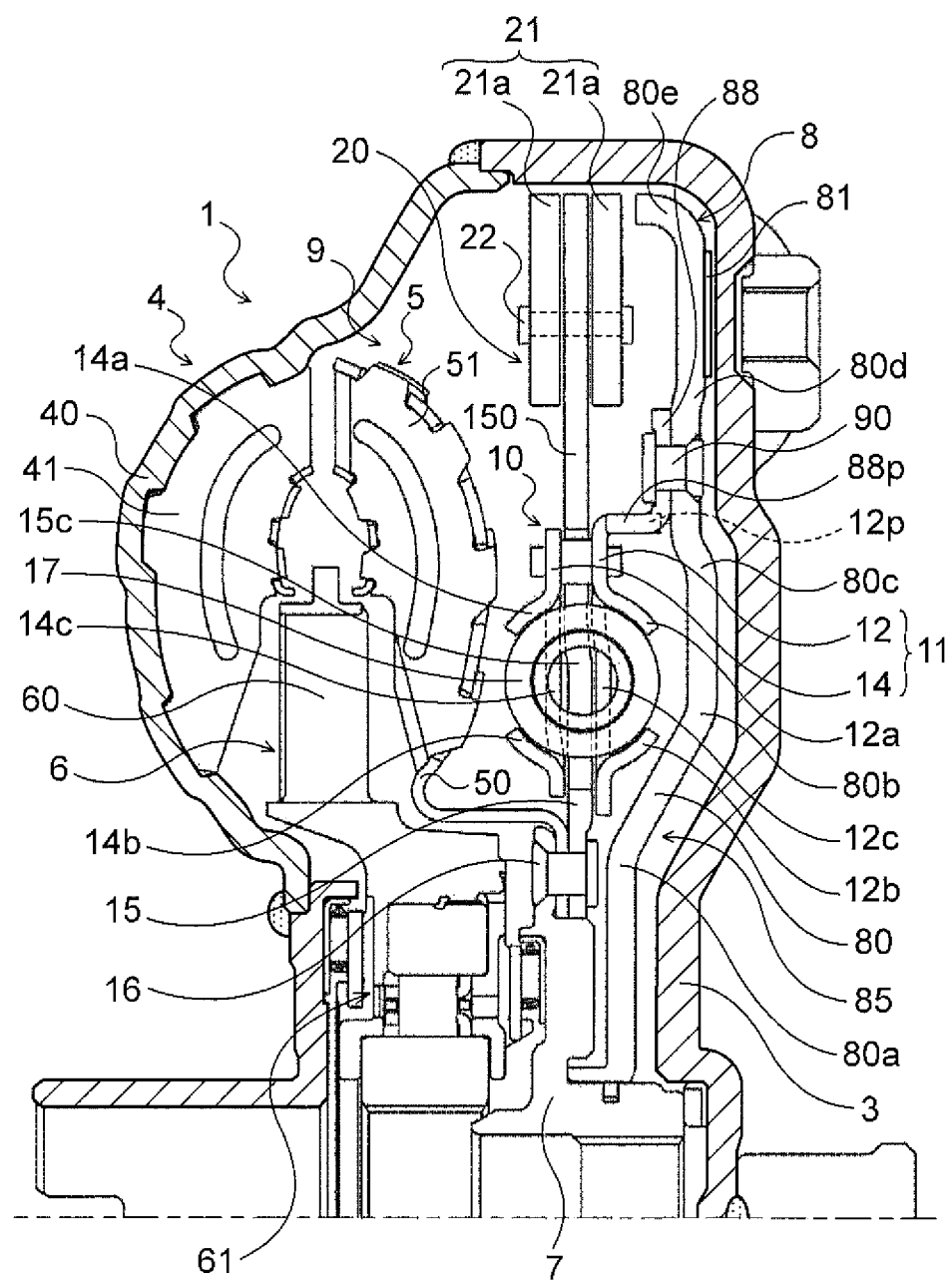
FIG. 1 is a partial cross-sectional view illustrating a starting device according to an embodiment of the present disclosure.

FIG. 1 is a partial cross-sectional view illustrating a starting device 1 according to an embodiment of the present disclosure. The starting device 1 illustrated in FIG. 1 is mounted on a vehicle including an engine (internal combustion engine) serving as a motor. The starting device 1 includes a front cover 3 serving as an input member that is coupled to a crankshaft of the engine, a pump impeller (input-side fluid transmission element) 4 that is fixed to the front cover 3 and rotates together with the front cover 3, a turbine runner (output-side fluid transmission element) 5 that is rotatable coaxially with the pump impeller 4, a damper hub 7 serving as an output member that is coupled to the damper mechanism 10 and fixed to an input shaft IS (see FIG. 3) of a transmission as an automatic transmission (AT) or a continuously variable transmission (CVT), a lock-up clutch 8 as a hydraulic single-plate clutch, a damper mechanism 10, and a centrifugal pendulum vibration absorber 20 that is coupled to the damper mechanism 10.

The pump impeller 4 includes a pump shell 40 that is tightly fixed to the front cover 3, and a plurality of pump blades 41 disposed on the inner surface of the pump shell 40. The turbine runner 5 includes a turbine shell 50 and a plurality of turbine blades 51 disposed on the inner surface of the turbine shell 50. The inner peripheral portion of the turbine shell 50 is fixed to the damper hub 7 via a plurality of rivets. The pump impeller 4 and the turbine runner 5 face each other, and a stator 6 that adjusts the flow of hydraulic oil (hydraulic fluid) from the turbine runner 5 to the pump impeller 4 is disposed coaxially therebetween. The stator 6 includes a plurality of stator blades 60. The rotational direction of the stator 6 is set to only one direction by a one-way clutch 61. The pump impeller 4, the turbine runner 5, and the stator 6 form a torus (annular flow passage) for circulating the hydraulic oil, and function as a torque converter (fluid transmission device) having a torque amplifying function. In the starting device 1, the stator 6 and the one-way clutch 61 may be omitted, and the pump impeller 4 and the turbine runner 5 may function as a fluid coupling.

The lock-up clutch 8 can perform lock-up to couple the front cover 3 to the damper hub 7, that is, the input shaft IS, via the damper mechanism 10 and can release the lock-up. The lock-up clutch 8 includes a lock-up piston 80 having an annular friction material 81 that is in frictional engagement with the front cover 3. As illustrated in FIG. 1, the lock-up piston 80 is disposed inside the front cover 3 and near the inner wall surface of the front cover 3 on the engine side (right side in FIG. 1). The lock-up piston 80 is axially slidably fitted on the damper hub 7. As illustrated in FIG. 1, the friction material 81 is attached to a front-cover-side outer peripheral surface of the lock-up piston 80. Further, in the lock-up piston 80, a plurality of annular bent portions (throttle portions) 80a, 80b, 80c, 80d, and 80e are formed at intervals in the radial direction, as illustrated in FIG. 1. Thus, it is possible to increase the strength of the lock-up piston 80, and to suppress deformation of the lock-up piston 80 upon application of hydraulic pressure.

A lock-up chamber 85 is defined between the lock-up piston 80 (surface on the right side in FIG. 1) and the front cover 3. Hydraulic oil supplied from a hydraulic control device (not illustrated) flows into the lock-up chamber 85 through an oil passage (not illustrated) formed in the input shaft IS and so on. The hydraulic oil supplied to the lock-up chamber 85 flows from the lock-up chamber 85 into a fluid transmission chamber 9 accommodating the pump impeller 4, the turbine runner 5, and so on (torus). Accordingly, when the pressure in the fluid transmission chamber 9 is maintained equal to the pressure in the lock-up chamber 85, the lock-up piston 80 does not move toward the front cover 3 and does not frictionally engage with the front cover 3. On the other hand, when the pressure in the lock-up chamber 85 is reduced by the hydraulic control device (not illustrated), the lock-up piston 80 moves toward the front cover 3 due to the pressure difference and frictionally engages with the front cover 3. The front cover 3 is thus coupled to the damper hub 7 via the damper mechanism 10.

As illustrated in FIG. 1, the damper mechanism 10 includes, as rotary elements, an annular drive member (input element) 11 that is coupled to the lock-up piston 80 of the lock-up clutch 8 so as to rotate therewith, and an annular driven member (output element) 15 that is coupled to the input shaft IS of the transmission. The damper mechanism 10 also includes, as power transmission elements, a plurality of (four, for example) springs (elastic bodies) 17 concentrically disposed at equal intervals. In the present embodiment, the springs 17 are arc coil springs each made of a metal material that is wound so as to have an axis extending in an arc shape when no load is applied thereto, Accordingly, it is possible to further reduce the rigidity (reduce the spring constant) of the springs 17, and thus to further reduce the rigidity (achieve a longer stroke) of the damper mechanism 10. It is apparent that the springs 17 may be linear coil springs each made of a metal material that is wound in a helical shape so as to have an axis (center line) extending straight when no load is applied thereto.

The drive member 11 serving as an input element of the damper mechanism 10 includes an annular first input plate member 12 disposed close to the lock-up piston 80 (front cover 3), and an annular second input plate member 14 disposed farther from the lock-up piston 80 than the first input plate member 12 and coupled to the first input plate member 12 via a plurality of rivets.

As illustrated in FIG. 1, the first input plate member 12 disposed on the front cover 3 (lock-up piston 80) side includes a plurality of (four in the present embodiment) spring support portions 12a each supporting (guiding) the outer periphery of its corresponding spring 17 from the front cover 3 (engine) side, a plurality of (four in the present embodiment) spring support portions 12b each supporting (guiding) the inner periphery of its corresponding spring 17 from the front cover 3 side, and a plurality of (four in the present embodiment) spring abutment portions 12c each radially extending between circumferentially adjacent spring support portions 12a and 12b. When the damper mechanism 10 is mounted, each spring abutment portion 12c is located between and abuts against two adjacent springs 17.

The second input plate member 14 disposed on the pump impeller 4 and turbine runner 5 side includes a plurality of (four in the present embodiment) spring support portions 14a each supporting (guiding) the outer periphery of its corresponding spring 17 from the turbine runner 5 (transmission) side, a plurality of (four in the present embodiment) spring support portions 14b each supporting (guiding) the inner periphery of its corresponding spring 17 from the turbine runner 5 side, and a plurality of (four in the present embodiment) spring abutment portions 14c each radially extending between circumferentially adjacent spring support portions 14a and 14b. When the damper mechanism 10 is mounted, each spring abutment portion 14c is located between and abuts against two adjacent springs 17. Further, the plurality of springs 17 are supported by the spring support portions 12a and 12b of the first input plate member 12 and the spring support portions 14a and 14b of the second input plate member 14, and are disposed in the fluid transmission chamber 9 so as to be close to the inner peripheral portion of the turbine shell 50.

The driven member 15 is disposed between the first input plate member 12 and the second input plate member 14 of the drive member 11, and is fixed to the damper hub 7 together with the turbine shell 50 of the turbine runner 5 via a plurality of rivets 16. Thus, the driven member 15 is coupled to the input shaft IS of the transmission via the damper hub 7. Further, the driven member 15 includes a plurality of (four in the present embodiment) spring abutment portions 15c, each capable of abutting against an end of its corresponding spring 17. When the damper mechanism 10 is mounted, the two facing spring abutment portions 15c abut against the ends of the spring 17 (support the both ends of the spring 17) located therebetween.

Further, the driven member 15 includes a mass body support portion 150 extending radially outward beyond the first and second input plate members 12 and 14. The mass body support portion 150 of the driven member 15 swingably supports a plurality of (three to four, for example) pendulum mass bodies 21 such that the pendulum mass bodies 21 are adjacent to each other in the circumferential direction. Thus, the driven member 15 serving as a support member and the plurality of pendulum mass bodies 21 form the centrifugal pendulum vibration absorber 20. In the centrifugal pendulum vibration absorber 20, when the driven member 15 serving as the support member supporting the pendulum mass bodies 21 rotates, the plurality of pendulum mass bodies 21 swing in the same direction with respect to the driven member 15. Thus, vibration having a phase opposite to that of vibration of the driven member 15 is applied to the driven member 15 of the damper mechanism 10. Since the driven member 15 of the damper mechanism 10 is used also as the support member of the centrifugal pendulum vibration absorber 20, it is possible to reduce the number of components and to further reduce the overall size of the starting device 1.

As illustrated in FIG. 1, the plurality of pendulum mass bodies 21 of the centrifugal pendulum vibration absorber 20 are disposed on the outer side of the springs 17 so as to surround the plurality of springs 17. In the present embodiment, each pendulum mass body 21 includes a support shaft (roller) 22 that is rotatably inserted through a corresponding one of a plurality of guide holes which are, for example, substantially arc-shaped elongated holes and which are formed at regular intervals in the mass body support portion 150 and, and two metal plates (weights) 21a that are fixed to the both ends of the support shaft 22. However, the configuration of the centrifugal pendulum vibration absorber 20 is not limited thereto. Further, the centrifugal pendulum vibration absorber 20 uses the driven member 15 as the support member supporting the pendulum mass bodies 21, and thereby is coupled to the driven member 15 of the damper mechanism 10. However, a dedicated support member may be used and the support member may be fixed to the driven member 15 of the damper mechanism 10.

In the following, a coupling structure between the lock-up piston 80 of the lock-up clutch 8 and the drive member 11 of the damper mechanism 10 will be described.

Figure 2:
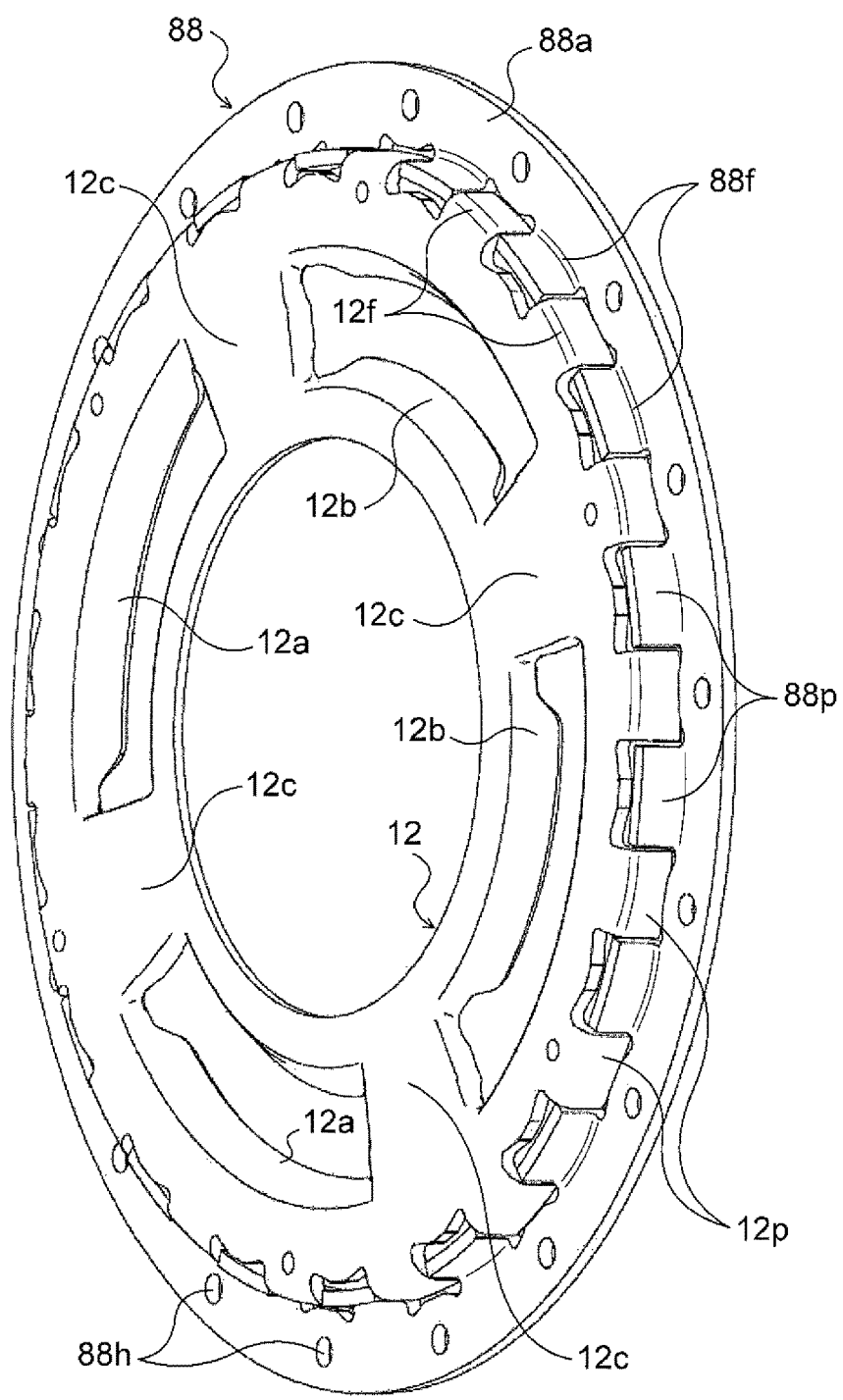
FIG. 2 is an enlarged perspective view illustrating a main part of the starting device of FIG. 1.

As illustrated in FIGS. 1 and 2, the lock-up piston 80 includes on its back surface (surface on the left side in FIG. 1) an annular coupling member 88 that is fixed via a plurality of rivets 90. The coupling member 88 is formed by pressing a metal plate, for example, and includes an annular fixed portion 88a in which a plurality of rivet holes 88h for insertion of the rivets 90 are arranged at equal intervals, and a plurality of drive-side projections 88p extending from the inner peripheral edge of the fixed portion 88a in the axial direction of the coupling member 88 (starting device 1). The plurality of drive-side projections 88p extend from the inner peripheral edge of the fixed portion 88a via respective bent portions 88f, and are arranged circumferentially at equal intervals. There is a space with a constant circumferential length between each two adjacent drive-side projections 88p. Further, the axial length of each drive-side projection 88p is sufficiently longer than the piston stroke of the lock-up piston 80. Note that the plurality of rivet holes 88h do not necessarily have to be arranged at equal intervals.

The coupling member 88 is fixed to the lock-up piston 80 so as to have the plurality of drive-side projections 88p extend on the radially inner side of the plurality of rivets 90 toward the first input plate member 12 of the drive member 11 in the axial direction of the starting device 1, and so as to be located between the radially adjacent bent portions 80c and 80d and slightly radially inward of the friction material 81. Accordingly, since the plurality of rivets 90, that is, the fixed portion 88a of the coupling member 88, are disposed further radially outward, the annular bent portions 80c and 80d close to the fixed portion 88a, in particular, the bent portions 80c disposed radially inward, can be disposed further radially outward while disposing the plurality of drive-side projections 88p radially inward (on the axis side of the starting device 1). Further, as illustrated in FIG. 1, the starting device 1 (damper mechanism 10) can be structured such that the plurality of rivets 90 and the springs 17 of the damper mechanism 10 are not axially aligned. Thus, it is possible to increase the strength of the outer peripheral region of the lock-up piston 80 and thereby to more effectively suppress deformation of the outer periphery of the lock-up piston 80, and also possible to more effectively suppress an increase in the axial length to further reduce the size of the starting device 1.

Further, the first input plate member 12 of the drive member 11 includes a plurality of driven-side projections 12p extending from the outer peripheral edge in the axial direction of the drive member 11 (starting device 1). The plurality of driven-side projections 12p extend from the outer peripheral edge of the first input plate member 12 via respective bent portions 12f, and are arranged circumferentially at equal intervals. Thus, there is a space between each two adjacent driven-side projections 12p. The circumferential length of each driven-side projection 12p is set to be slightly less than the circumferential length of the space between each two adjacent drive-side projections 88p. The circumferential length of the space between each adjacent two of the driven-side projections 12p is set to be slightly greater than the circumferential length of each drive-side projection 88p. Further, the axial length of each driven-side projection 12p is also sufficiently longer than the piston stroke of the lock-up piston 80. Note that the plurality of driven-side projections 12p do not necessarily have to be arranged at equal intervals.

Further, as illustrated in FIGS. 1 and 2, each of the drive-side projections 88p of the lock-up piston 80, that is, the coupling member 88, is fitted in the space between two adjacent driven-side projections 12p of the first input plate member 12, on the radially inner side of the plurality of pendulum mass bodies 21 of the centrifugal pendulum vibration absorber 20. Similarly, each of the driven-side projections 12p of the first input plate member 12 is fitted in the space between two adjacent drive-side projections 88p of the lock-up piston 80 (coupling member 88), on the radially inner side of the plurality of pendulum mass bodies 21 of the centrifugal pendulum vibration absorber 20. Accordingly, as illustrated in FIGS, 1 and 2, the plurality of drive-side projections 88p and the plurality of driven-side projections 12p are alternately and concentrically arranged on the radially inner side of the plurality of pendulum mass bodies 21. Thus, the lock-up piston 80 and the first input plate member 12, that is, the drive member 11, are coupled (fitted and coupled) to each other on the radially inner side of the plurality of pendulum mass bodies 21 so as to rotate together. Note that, as illustrated in FIG. 2, the coupling member 88 is structured such that the outer surface of each of the driven-side projections 12p fitted in the space between two adjacent drive-side projections 88p of the lock-up piston 80 (coupling member 88) abuts against the outer peripheral edge of the fixed portion 88a. Thus, the first input plate member 12 can be aligned by the coupling member 88 fitted in the damper hub 7.

In the following, the operation of the starting device 1 structured as described above will be described.

Figure 3:
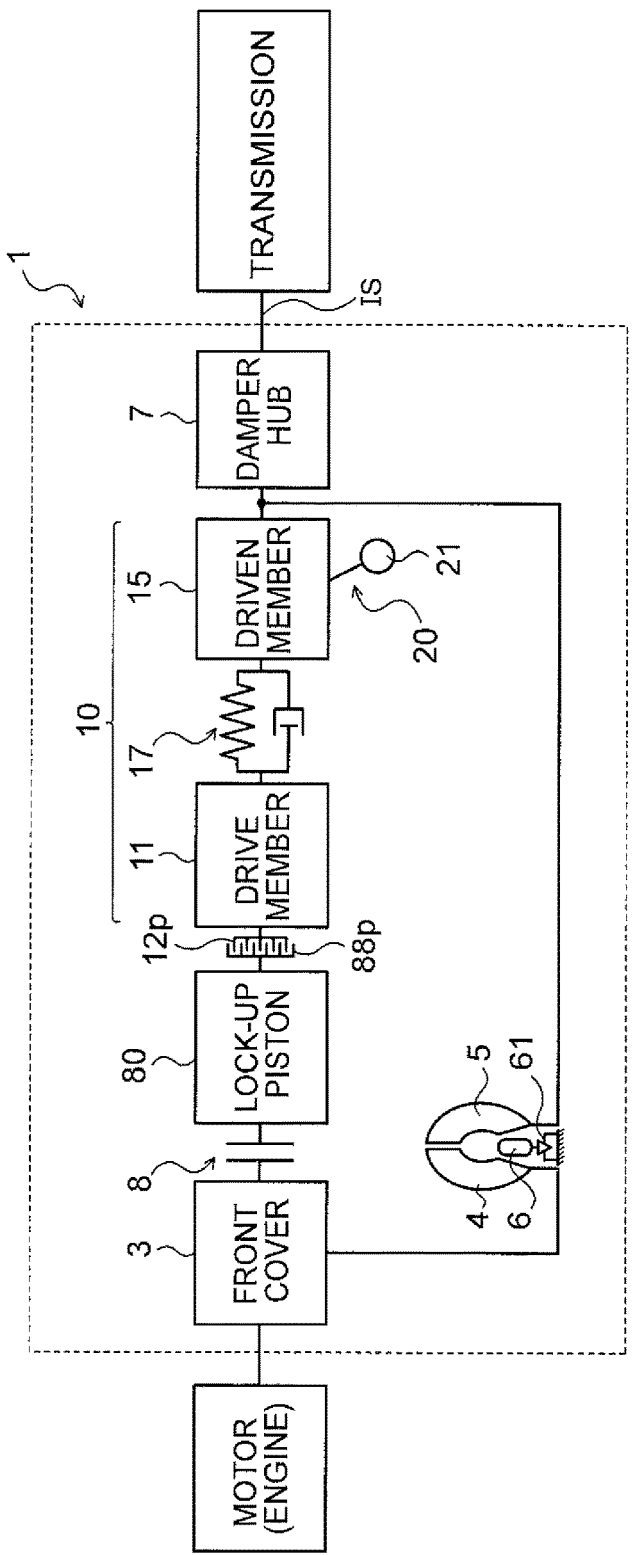
FIG. 3 is a schematic configuration diagram illustrating the starting device of FIG. 1.

As is understood from FIG. 3, when lock-up is released by the lock-up clutch 8 of the starting device 1, torque (power) from the engine serving as a motor is transmitted to the input shaft IS of the transmission through a path extending through the front cover 3, the pump impeller 4, the turbine runner 5, and the damper hub 7. On the other hand, as is understood from FIG. 3, when lock-up is performed by the lock-up clutch 8 of the starting device 1, torque (power) from the engine is transmitted to the input shaft IS of the transmission through a path extending through the front cover 3, the lock-up clutch 8 (lock-up piston 80), the drive member 11, the springs 17, the driven member 15, and the damper hub 7.

When lock-up is performed by the lock-up clutch 8, the drive member 11 coupled to the front cover 3 by the lock-up clutch 8 rotates along with rotation of the engine. Thus, each of the spring abutment portions 12c of the first input plate member 12 and the spring abutment portions 14c of the second input plate member 14 presses one end the corresponding spring 17, and the other end of each spring 17 presses the corresponding spring abutment portion 15c of the driven member 15. Accordingly, the torque transmitted from the engine to the front cover 3 is transmitted to the input shaft IS of the transmission, and fluctuations in the torque from the engine is mainly damped (absorbed) by the springs 17 of the damper mechanism 10. Further, in the starting device 1, when the damper mechanism 10 that is coupled to the front cover 3 by the lock-up clutch 8 due to lock-up rotates with the front cover 3, the driven member 15 of the damper mechanism 10 also rotates about the axis of the starting device 1 in the same direction as the front cover 3. As the driven member 15 rotates, the pendulum mass bodies 21 of the centrifugal pendulum vibration absorber 20 swing in the same direction with respect to the driven member 15. Thus, vibration having a phase opposite to that of vibration (resonance) of the driven member 15 is applied from the centrifugal pendulum vibration absorber 20 to the driven member 15, whereby vibration can be damped (absorbed) between the front cover 3 and the damper hub 7 also by the centrifugal pendulum vibration absorber 20.

Further, in the starting device 1, since the lock-up piston 80 and the drive member 11 are coupled to each other on the radially inner side of the plurality of pendulum mass bodies 21 of the centrifugal pendulum vibration absorber 20, a member that couples the lock-up piston 80 and the drive member 11 to each other does not need to be disposed between the lock-up piston 80 and the plurality of pendulum mass bodies 21 or on the radially outer side of the plurality of pendulum mass bodies 21. Accordingly, in the starting device 1, it is possible to suppress an increase in particular in the axial length, and to ensure sufficient installation space for the plurality of pendulum mass bodies 21 in both the axial direction and the radial direction of the starting device 1. Thus, it is possible to reduce the overall size of the starting device 1, and to further improve the vibration damping performance of the centrifugal pendulum vibration absorber 20 by increasing the size, that is, the weight of the pendulum mass bodies 21.

Further, the lock-up piston 80 of the lock-up clutch 8 includes the annular coupling member 88 that includes the plurality of bent portions 88f and drive-side projections 88p and that is fixed to the lock-up piston 80 via the plurality of rivets 90. The coupling member 88 is fixed to the lock-up piston 80 such that the plurality of drive-side projections 88p extend on the radially inner side of the plurality of rivets 90 toward the drive member 11. Thus, in the starting device 1, it is possible to further increase the space on the radially outer side of the drive-side projections 88p and the driven-side projections 12p extending between the lock-up clutch 8 and the first input plate member 12, and therefore to ensure greater installation space for the plurality of pendulum mass bodies 21.

Further, as described above, by coupling the lock-up piston 80 and the first input plate member 12 to each other by fitting the plurality of drive-side projections 88p of the lock-up piston 80 (coupling member 88) and the plurality of driven-side projections 12p of the first input plate member 12 (drive member 11) into each other, it is possible to further increase the contact area between the lock-up piston 80 and the first input plate member 12, that is, the drive member 11. Accordingly, it is possible to transmit greater torque from the lock-up piston 80 to the drive member 11 while ensuring a high durability of the coupling part between the lock-up piston 80 and the drive member 11, that is, the drive-side projections 88p and the driven-side projections 12p. Moreover, since the drive-side projections 88p and the driven-side projections 12p extend from the lock-up piston 80 and the first input plate member 12 via the bent portions 88f and 12f, respectively, it is possible to further increase the strength around the coupling part between the lock-up piston 80 and the drive member 11, that is, around the drive-side projections 88p and the driven-side projections 12p.

Further, in the starting device 1, the turbine runner 5 is coupled (fixed) to the driven member 15 of the damper mechanism 10 via the plurality of rivets 16. Therefore, when lock-up is performed, the turbine runner 5 not involved in transmission of torque between the front cover 3 and the input shaft IS of the transmission serves as a so-called turbine damper. Accordingly, when lock-up is performed, vibration of the driven member 15 and hence vibration of the entire damper mechanism 10 can be effectively absorbed by both the centrifugal pendulum vibration absorber 20 and the turbine damper formed by the turbine runner 5.

Figure 4:
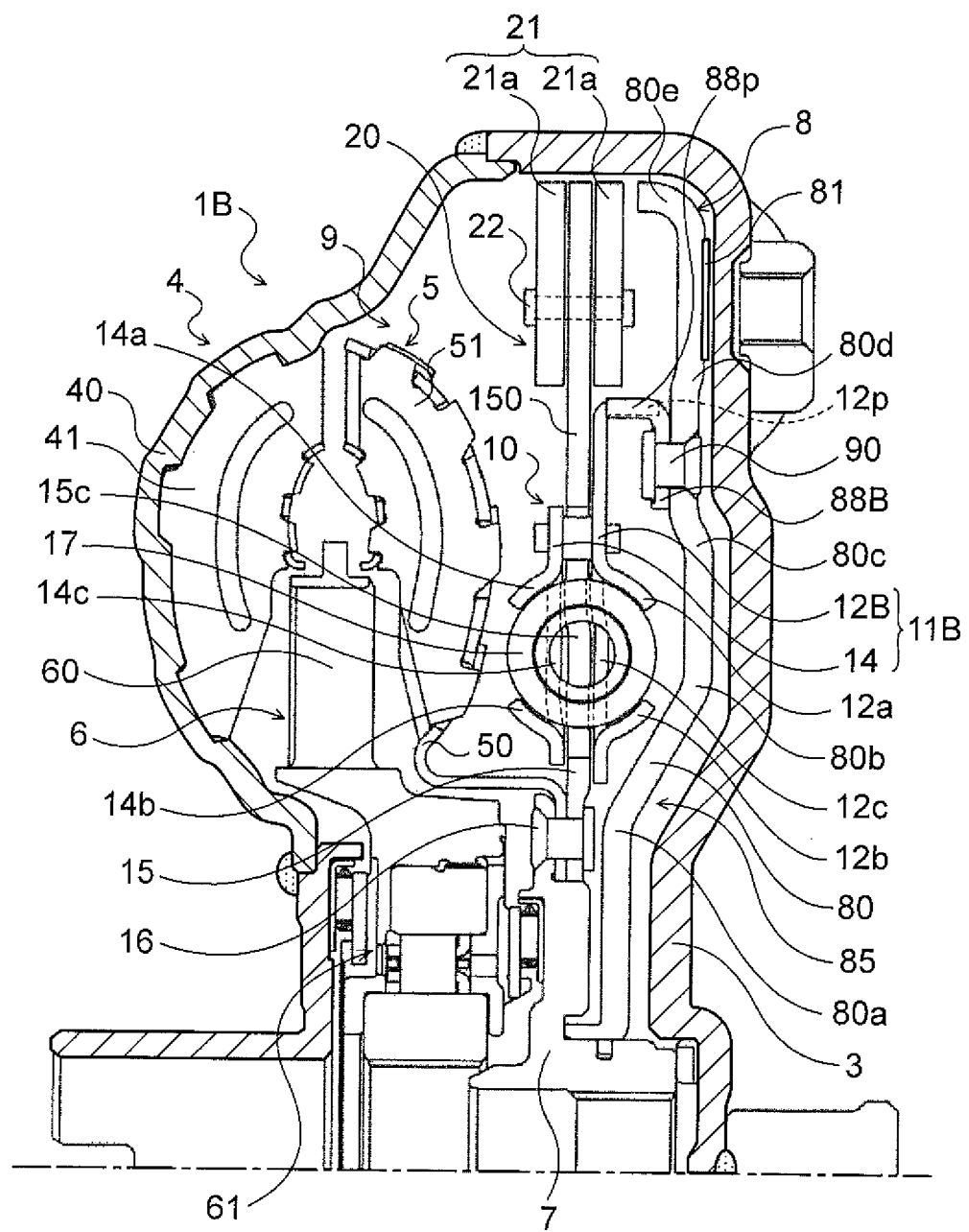
FIG. 4 is a partial cross-sectional view illustrating a starting device according to another embodiment of the present disclosure.

FIG. 4 is a partial cross-sectional view illustrating a starting device 1B according to another embodiment of the present disclosure. Elements of the starting device 1B that are the same as elements of the above-described starting device 1 are denoted by the same reference numerals, and redundant descriptions will be omitted. In the starting device 1B illustrated in FIG. 4, a coupling member 88B of a lock-up piston 80 includes a plurality of drive-side projections 88p extending from the outer peripheral edge of an annular fixed portion through which a plurality of rivets 90 are inserted, in the axial direction of the coupling member 88B (starting device 1B). Further, the coupling member 88B is fixed to the lock-up piston 80 so as to have the plurality of drive-side projections 88p extending on the radially outer side of the plurality of rivets 90 toward a first input plate member 12B of a drive member 11B in the axial direction of the starting device 1B, and so as to be located between radially adjacent bent portions 80c and 80d and slightly radially inward of a friction material 81. Further, the first input plate member 12B of the drive member 11B has a greater outer radius than that of the first input plate member 12 of the starting device 1B. The plurality of driven-side projections 12p extending from the outer peripheral edge of the first input plate member 12B in the axial direction of the drive member 11B (starting device 1B) are located radially outward of the driven-side projections 12p of the starting device 1B.

Further, each of the drive-side projections 88p of the lock-up piston 80, that is, the coupling member 88B, is fitted in the space between two adjacent driven-side projections 12p of the first input plate member 12B, on the radially inner side of the plurality of pendulum mass bodies 21 of the centrifugal pendulum vibration absorber 20. Similarly, each of the driven-side projections 12p of the first input plate member 12 is fitted in the space between two adjacent drive-side projections 88p of the lock-up piston 80 (coupling member 88B), on the radially inner side of the plurality of pendulum mass bodies 21 of the centrifugal pendulum vibration absorber 20. In this case as well, the plurality of drive-side projections 88p and the plurality of driven-side projections 12p are alternately and concentrically arranged on the radially inner side of the plurality of pendulum mass bodies 21, Thus, in the starting device 1B, the coupling part between the lock-up piston 80 and the drive member 11B, that is, the drive-side projections 88*p* and the driven-side projections 12*p* can be disposed further radially outward, while ensuring installation space for the plurality of pendulum mass bodies 21. Therefore, it is possible to increase the so-called torque radius, and thus to transmit greater torque from the lock-up piston 80 to the drive member 11B.

Figure 5:
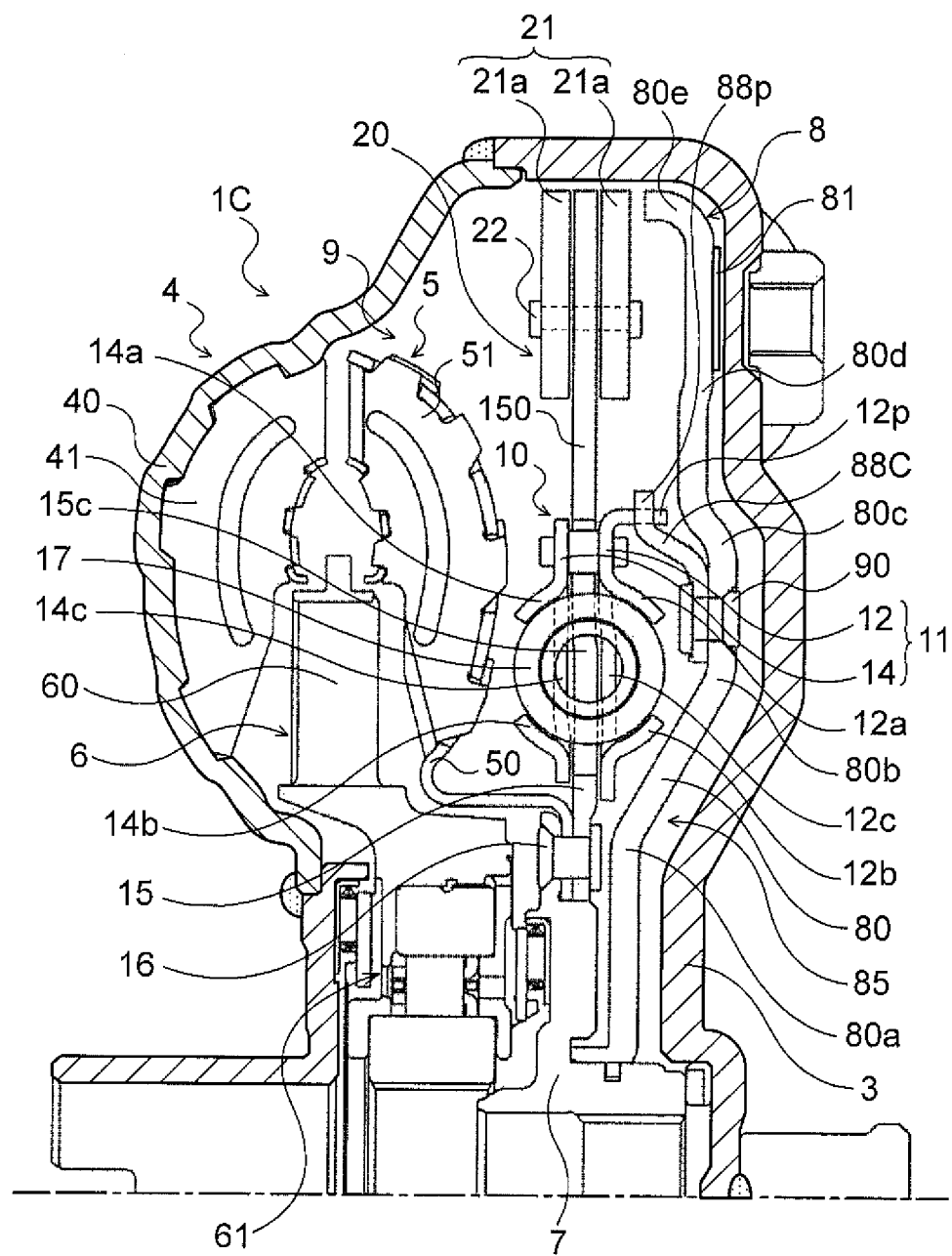
FIG. 5 is a partial cross-sectional view illustrating a starting device according to still another embodiment of the present disclosure.

FIG. 5 is a partial cross-sectional view illustrating a starting device 1C according to still another embodiment of the present disclosure. Elements of the starting device 1C that are the same as elements of the above-described starting device 1 are denoted by the same reference numerals, and redundant descriptions will be omitted, In the starting device 1C illustrated in FIG. 5, a coupling member 88C of a lock-up piston 80 includes a plurality of drive-side projections 88*p* extending from the outer peripheral edge of an annular fixed portion through which a plurality of rivets 90 are inserted, in the radial direction (outward) of the fixed portion. Further, each of the drive-side projections 88*p* of the lock-up piston 80, that is, the coupling member 88C, is fitted in the space between two adjacent driven-side projections 12*p* of a first input plate member 12 so as to be orthogonal to the two driven-side projections 12*p*, on the radially inner side of the plurality of pendulum mass bodies 21 of the centrifugal pendulum vibration absorber 20. Similarly, each of the driven-side projections 12*p* of the first input plate member 12 is fitted in the space between two adjacent drive-side projections 88*p* of the lock-up piston 80 (coupling member 88C) so as to be orthogonal to the two drive-side projections 88*p*, on the radially inner side of the plurality of pendulum mass bodies 21 of the centrifugal pendulum vibration absorber 20. Thus, the drive-side projections 88*p* of the lock-up piston 80 (coupling member 88C) and the driven-side projections 12*p* of the drive member 11 may be structured to be fitted into each other so as to be orthogonal to each other, on the radially inner side of the plurality of pendulum mass bodies 21 of the centrifugal pendulum vibration absorber 20.

Note that the coupling members 88, 88B, and so on do not necessarily have to be structured as the annular members described above, and a plurality of coupling members each having at least one bent portion 88*f* and one drive-side projection 88*p* may be fixed to the lock-up piston 80 via rivets 90 so as to be arranged circumferentially (in an annular shape). Further, instead of fixing a coupling member having a plurality of drive-side projections to a lock-up piston, the plurality of drive-side projections may be formed integrally with the lock-up piston. Further, the damper mechanism 10 included in the starting devices 1 through 1C described above transmits torque from the drive members 11 and 11B serving as input elements to the driven member 15 serving as an output element via the plurality of springs 17. However, the damper mechanism included in the starting device according to the present disclosure may be structured as a series damper mechanism that transmits torque (power) through a path extending through a drive member (input element), a first spring (first elastic body), an intermediate member (intermediate element), a second spring (second elastic body), and a driven member (output element). In this case, the centrifugal pendulum vibration absorber may be coupled to the intermediate element of the damper mechanism. Further, the damper mechanism included in the starting device according to the present disclosure may be a parallel damper mechanism structured such that a plurality of springs (elastic bodies) arranged spaced apart from each other in the radial direction act in parallel, for example.

As described above, the starting device according to the present disclosure includes: a damper mechanism including an input element to which power is transmitted from an input member, an output element that is coupled to an input shaft of a transmission, and elastic bodies that transmit torque between the input element and the output element; a lock-up clutch capable of performing lock-up to couple the input member to the input shaft of the transmission via the damper mechanism and capable of releasing the lock-up; and a centrifugal pendulum vibration absorber including a support member that rotates together with a rotary element of the damper mechanism, and a plurality of pendulum mass bodies that are swingably supported by the support member; wherein: the lock-up clutch is a single-plate clutch including a piston having a friction material that is in frictional engagement with the input member; and the piston and the input element of the damper mechanism are coupled to each other on a radially inner side of the plurality of pendulum mass bodies so as to rotate together.

This starting device includes: a damper mechanism; a single-plate lock-up clutch including a piston having a friction material that is in frictional engagement with an input member; and a centrifugal pendulum vibration absorber including a support member and a plurality of pendulum mass bodies that are swingably supported by the support member. Further, the piston of the lock-up clutch and the input element of the damper mechanism are coupled to each other on a radially inner side of the plurality of pendulum mass bodies so as to rotate together. Thus, since the piston and the input element are coupled to each other on the radially inner side of the plurality of pendulum mass bodies, a member that couples the piston and the input element to each other does not need to be disposed between the piston of the lock-up clutch and the plurality of pendulum mass bodies or on the radially outer side of the plurality of pendulum mass bodies. Therefore, it is possible to suppress an increase in particular in the axial length of the starting device, and to ensure sufficient installation space for the plurality of pendulum mass bodies in both the axial direction and the radial direction of the starting device. Thus, according to this starting device, it is possible to reduce the overall device size, and to further improve the vibration damping performance of the centrifugal pendulum vibration absorber by increasing the size, that is, the weight of the pendulum mass bodies.

Further, the piston may include a plurality of drive-side projections extending toward the input element via bent portions and arranged circumferentially at intervals; the input element may include a plurality of driven-side projections extending toward the piston via bent portions and arranged circumferentially at intervals; and each of the drive-side projections of the piston may be fitted between adjacent two of the driven-side projections of the input element, and each of the driven-side projections of the input element may be fitted between adjacent two of the drive-side projections of the piston. Thus, by coupling the piston and the input element to each other by fitting the plurality of drive-side projections of the piston and the plurality of driven-side projections of the input element into each other, it is possible to further increase the contact area between the piston and the input element. Accordingly, it is possible to transmit greater torque from the piston to the input element while ensuring a high durability of the coupling part between the piston and the input element, that is, the drive-side projections and the driven-side projections. Moreover, since the drive-side projections and the driven-side projections extend from the piston and the input element via the bent portions, respectively, it is possible to further increase the strength around the coupling part between the piston and the input element, that is, around the drive-side projections and the driven-side projections.

Further, the input element may include a first input plate member disposed close to the piston, and a second input plate member disposed farther from the piston than the first input plate member and coupled to the first input plate member; the rotary element that rotates together with the support member of the centrifugal pendulum vibration absorber may be disposed between the first and second input plate members; and the bent portions and the driven-side projections of the input element may be provided in the first input plate member.

Further, the driven-side projections of the first input plate member and the drive-side projections of the piston may be disposed radially inward of the plurality of pendulum mass bodies and radially outward of the elastic bodies of the damper mechanism. Thus, since the driven-side projections and the drive-side projections are not disposed axially between the pendulum mass bodies and the piston or axially between the elastic bodies of the damper mechanism and the piston, it is possible to suppress an increase in the axial length of the starting device while ensuring the so-called torque radius.

Further, the driven-side projections of the first input plate member and the drive-side projections of the piston may at least partially overlap the elastic bodies of the damper mechanism in a direction orthogonal to a rotation axis of the damper mechanism. Thus, it is possible to further reduce the axial length of the starting device.

Further, the input element may include a first input plate member disposed close to the piston, and a second input plate member disposed farther from the piston than the first input plate member and coupled to the first input plate member; the rotary element that rotates together with the support member of the centrifugal pendulum vibration absorber may be disposed between the first and second input plate members; the piston may include a plurality of drive-side projections extending toward the input element via bent portions and arranged circumferentially at intervals; the first input plate member may include a plurality of driven-side projections extending toward the piston via bent portions and arranged circumferentially at intervals; and each of the drive-side projections of the piston may be fitted between adjacent two of the driven-side projections of the first input plate member, and each of the driven-side projections of the first input plate member may be fitted between adjacent two of the drive-side projections of the piston. Thus, by coupling the piston and the input element to each other by fitting the plurality of drive-side projections of the piston and the plurality of driven-side projections of the first input plate member into each other, it is possible to further increase the contact area between the piston and the input element, that is, the first input plate member. Accordingly, it is possible to transmit greater torque from the piston to the input element while ensuring a high durability of the coupling part between the piston and the input element, that is, the drive-side projections and the driven-side projections. Moreover, since the drive-side projections and the driven-side projections extend from the piston and the first input plate member via the bent portions, respectively, it is possible to further increase the strength around the coupling part between the piston and the input element, that is, around the drive-side projections and the driven-side projections.

Further, the piston may include a coupling member having the bent portions and the drive-side projections and fixed to the piston via rivets, and the coupling member may be fixed to the piston such that the drive-side projections extend on a radially inner side of the rivets toward the input element. Thus, it is possible to further increase the space on the radially outer side of the drive-side projections and the driven-side projections extending between the piston and the first input plate member, and therefore to ensure greater installation space for the plurality of pendulum mass bodies, Further, the piston may include a coupling member having the bent portions and the drive-side projections and fixed to the piston via rivets, and the coupling member may be fixed to the piston such that the drive-side projections extend on a radially outer side of the rivets toward the input element. Thus, the coupling part between the piston and the input element, that is, the drive-side projections and the driven-side projections can be disposed further radially outward, while ensuring installation space for the plurality of pendulum mass bodies. Therefore, it is possible to increase the so-called torque radius, and thus to transmit greater torque from the piston to the input element.

Further, the piston may include an annular bent portion that is formed to be located radially inward of the rivets. Thus, it is possible to increase the strength of the piston, and thereby to more effectively suppress deformation of the piston. In particular, in the case where the coupling member is fixed to the piston such that the drive-side projections extend on a radially inner side of the rivets toward the input element, since the rivets are disposed further radially outward, the annular bent portion can also be disposed further radially outward while disposing the drive-side projections radially inward (on the axis side of the starting device). Thus, it is possible to increase the strength of the outer peripheral region of the piston, and thereby to more effectively suppress deformation of the outer periphery of the piston.

Further, the starting device may be structured such that the rivets and the elastic bodies of the damper mechanism are not axially aligned. Thus, it is possible to more effectively suppress an increase in the axial length so as to further reduce the size of the starting device.

Further, the starting device may further include a pump impeller rotatable together with the input member, and a turbine runner coupled to the output element of the damper mechanism, wherein torque may be transmitted from the input element to the output element of the damper mechanism via the elastic bodies, and the output element of the damper mechanism may be used also as the support member of the centrifugal pendulum vibration absorber. Thus, since the turbine runner is coupled to the output element of the damper mechanism, when lock-up is performed by the lock-up clutch, the turbine runner not involved in transmission of torque between the input member and the input shaft of the transmission serves as a so-called turbine damper. Accordingly, when lock-up is performed, vibration of the output element and hence vibration of the entire damper mechanism can be effectively absorbed by both the centrifugal pendulum vibration absorber and the turbine damper formed by the turbine runner. Further, since the output element of the damper mechanism is used also as the support member of the centrifugal pendulum vibration absorber, it is possible to reduce the number of components and to further reduce the overall size of the starting device.

The present disclosure is not in any way limited to the embodiments described above, and it is apparent that various modifications may be made within the broad scope of the present disclosure. The above-described embodiments of the disclosure are merely specific examples of the disclosure described in the "SUMMARY" section, and do not limit the elements of the disclosure described in the "SUMMARY" section.

INDUSTRIAL APPLICABILITY

The present disclosure is applicable in the field of manufacturing starting devices and the like.

The invention claimed is:

1. A starting device comprising:
   a damper mechanism including an input element to which power is transmitted from an input member, an output element that is coupled to an input shaft of a transmission, and elastic bodies that transmit torque between the input element and the output element;
   a lock-up clutch capable of performing lock-up to couple the input member to the input shaft of the transmission via the damper mechanism and capable of releasing the lock-up; and
   a centrifugal pendulum vibration absorber including a support member that rotates together with a rotary element of the damper mechanism, and a plurality of pendulum mass bodies that are swingably supported by the support member, wherein:
     the lock-up clutch is a single-plate clutch including a piston having a friction material that is in frictional engagement with the input member;
     the piston and the input element of the damper mechanism are coupled to each other on a radially inner side of the plurality of pendulum mass bodies so as to rotate together;
     the piston includes a plurality of drive-side projections extending toward the input element via bent portions and arranged circumferentially at intervals;
     the input element includes a plurality of driven-side projections extending toward the piston via bent portions and arranged circumferentially at intervals; and
     each of the drive-side projections of the piston is fitted between adjacent two of the driven-side projections of the input element, and each of the driven-side projections of the input element is fitted between adjacent two of the drive-side projections of the piston.

2. The starting device according claim 1, wherein:
   the input element includes a first input plate member disposed close to the piston, and a second input plate member disposed farther from the piston than the first input plate member and coupled to the first input plate member;
   the rotary element that rotates together with the support member of the centrifugal pendulum vibration absorber is disposed between the first and second input plate members; and
   the bent portions and the driven-side projections of the input element are provided in the first input plate member.

3. The starting device according to claim 2, wherein the driven-side projections of the first input plate member and the drive-side projections of the piston are disposed radially inward of the plurality of pendulum mass bodies and radially outward of the elastic bodies of the damper mechanism.

4. The starting device according to claim 2, wherein the driven-side projections of the first input plate member and the drive-side projections of the piston at least partially overlap the elastic bodies of the damper mechanism in a direction orthogonal to a rotation axis of the damper mechanism.

5. The starting device according to claim 1, wherein:
   the piston includes a coupling member having the bent portions and the drive-side projections and fixed to the piston via rivets; and
   the coupling member is fixed to the piston such that the drive-side projections extend on a radially inner side of the rivets toward the input element.

6. The starting device according to claim 1, wherein:
   the piston includes a coupling member having the bent portions and the drive-side projections and fixed to the piston via rivets; and
   the coupling member is fixed to the piston such that the drive-side projections extend on a radially outer side of the rivets toward the input element.

7. The starting device according to claim 5, wherein the piston includes an annular bent portion that is formed to be located radially inward of the rivets.

8. The starting device according to claim 5, wherein the rivets and the elastic bodies of the damper mechanism are not axially aligned.

9. The starting device according to claim 1, further comprising:
   a pump impeller rotatable together with the input member; and
   a turbine runner coupled to the output element of the damper mechanism, wherein:
     torque is transmitted from the input element to the output element of the damper mechanism via the elastic bodies; and
     the output element of the damper mechanism is used also as the support member of the centrifugal pendulum vibration absorber.

10. The starting device according to claim 3, wherein the driven-side projections of the first input plate member and the drive-side projections of the piston at least partially overlap the elastic bodies of the damper mechanism in a direction orthogonal to a rotation axis of the damper mechanism.

11. The starting device according to claim 2, wherein:
   the piston includes a coupling member having the bent portions and the drive-side projections and fixed to the piston via rivets; and
   the coupling member is fixed to the piston such that the drive-side projections extend on a radially inner side of the rivets toward the input element.

12. The starting device according to claim 2 wherein:
   the piston includes a coupling member having the bent portions and the drive-side projections and fixed to the piston via rivets; and
   the coupling member is fixed to the piston such that the drive-side projections extend on a radially outer side of the rivets toward the input element.

13. The starting device according to claim 6, wherein the piston includes an annular bent portion that is formed to be located radially inward of the rivets.

14. The starting device according to claim 6, wherein the rivets and the elastic bodies of the damper mechanism are not axially aligned.

15. The starting device according to claim 10, wherein:
   the piston includes a coupling member having the bent portions and the drive-side projections and fixed to the piston via rivets; and the coupling member is fixed to the piston such that the drive-side projections extend on a radially inner side of the rivets toward the input element.

16. The starting device according to claim 10, wherein:

the piston includes a coupling member having the bent portions and the drive-side projections and fixed to the piston via rivets; and the coupling member is fixed to the piston such that the drive-side projections extend on a radially outer side of the rivets toward the input element.

17. The starting device according to claim 15, wherein the piston includes an annular bent portion that is formed to be located radially inward of the rivets.

18. The starting device according to claim 17, wherein the rivets and the elastic bodies of the damper mechanism are not axially aligned.

19. The starting device according to claim 18, further comprising:

a pump impeller rotatable together with the input member; and a turbine runner coupled to the output element of the damper mechanism, wherein:

torque is transmitted from the input element to the output element of the damper mechanism via the elastic bodies; and the output element of the damper mechanism is used also as the support member of the centrifugal pendulum vibration absorber.

* * * * *